United States Patent [19]

Harrison

[11] Patent Number: 5,368,263
[45] Date of Patent: Nov. 29, 1994

[54] WATER HEATER STAND

[76] Inventor: Guy W. Harrison, 1709 Parklane, Edmond, Okla. 73034

[21] Appl. No.: 75,652

[22] Filed: Jun. 11, 1993

[51] Int. Cl.⁵ ............................................. A47G 23/02
[52] U.S. Cl. .................................. 248/146; 248/176; 248/346
[58] Field of Search ............... 248/146, 176, 346, 154; 52/27, 98, 99, 299, 169.9

[56] References Cited

U.S. PATENT DOCUMENTS

| | | | |
|---|---|---|---|
| 2,199,481 | 5/1940 | Chappell | 248/146 |
| 2,204,686 | 6/1940 | Little, Jr. | 248/146 |
| 3,272,466 | 9/1966 | Sherman | 248/146 |
| 4,267,998 | 5/1981 | Weirich | 248/165 |
| 4,555,837 | 12/1985 | Daugirda et al. | 29/432.1 |
| 4,932,621 | 6/1990 | Kowk | 248/146 |
| 5,199,676 | 4/1993 | Kowalewski | 248/149 |

FOREIGN PATENT DOCUMENTS 1120232  3/1982  Canada ............... 248/146

Primary Examiner—Ramon O. Ramirez
Attorney, Agent, or Firm—R. William Graham

[57] ABSTRACT

The present invention is directed to a height adjustable water heater stand which includes a drainage system. The water heater stand includes a height adjustable base, an arcuate support surface and retention lip having a punch-out portion to provide for a drain pipe attachment.

26 Claims, 2 Drawing Sheets

WATER HEATER STAND

BACKGROUND OF THE INVENTION

This invention relates to a height adjustable stand, and more particularly, to a height adjustable stand having a drainage system therein for support of a water heater.

Water heaters are typically positioned within a limited space of a dwelling and on a floor adjacent the garage. For example, the water heater is placed in a closet with a central heating unit wherein the closet may or may not be built on a raised platform.

Gasoline and other flammable liquids are commonly stored within the garage, and most commonly in cans on the garage floor. Not infrequently, these flammable liquids are spilled or leaked onto the garage floor and fumes emanating from these liquids tend to hover and travel low to the garage floor and into the area where the water heater is housed. There have been a number of accidents involving water heaters wherein a pilot light of the water heater is an instrument which ignites these fumes resulting in explosion and/or fire.

Additionally, a drain is normally formed in the floor of the closet which houses the water heater to catch leakage from the water heater. However, the location of the drain varies. Leaks can occur on a point of the water heater which directs water away from the drain creating a mess and defeating the purpose of the drain.

Attempts have been made at providing a water heater stand. Such attempts have failed to provide uniformity to the industry in meeting basic safety standards for supporting the water heater under dry or wet conditions. Such attempts also lack height adjustability, fail to provide for leakage, or are designed to inhibit manuverability for assembly and positioning within small work areas.

One type of strand described in U.S. Pat. No. 4,267,998 is directed to a wooden stand which requires on-site assembly. Such a stand lacks drainage directability, height adjustability and is susceptible to weakening from moisture.

Another type of stand disclosed in U.S. Pat. No. 5,199,676 is directed to a sheet-like metal stand which requires assembly at the site. Similarly, this stand lacks drainage directability and height adjustability.

There exists a need for a relatively inexpensive stand which can elevate the water heater and associated pilot light above the garage floor and/or air region of concern. There is also need for a height adjustable stand in order to raise the water heater a desired height while allowing accommodation of the water heater within the housing environment. Still there is another need to have a stand which is easy to install within a limited work space wherein the water heater is housed. There is also a need for a stand to include a drainage system. Finally, there is a need to provide a safe water heater stand which solves the above needs and brings uniformity to the industry.

SUMMARY OF THE PRESENT INVENTION

It is an object of the present invention to provide a relatively inexpensive stand which is height adjustable, and includes a drainage system and is relatively easy to install.

It is an object of the present invention to provide a water heater stand which is relatively light weight and capable of sustaining a water heater for extended periods of time under wet or dry conditions.

It is another object of the present invention to provide for a water heater stand which requires minimal or no assembly.

It is still another object of the present invention to provide for a water heater stand which is relatively safe.

It is yet another object of the present invention to provide for a water heater stand which is easily installed in limited a work area.

Accordingly, the invention is directed to a water heater stand for raising a water heater above a support floor a distance which is above and beyond a region of air lying adjacent the floor which is susceptible to containing flammable fumes emanating from flammable liquids on the floor, which includes a base of a predetermined height to raise the water heater a sufficient distance above the region of air. The base has a support surface for supporting the water heater and a retention lip member extending generally upwardly from the support surface to retain leakage from the water heater. The retention lip member has at least one punch-out portion formed therein which when removed provides an opening surface in the retention lip member to which a drain pipe can be readily connected thereto. The support surface is preferably arcuately shaped to aid drainage in this regard.

One embodiment of the invention is directed to a height adjustable stand for supporting water heaters of various sizes, comprising four generally rectangular side panels of a predetermined height and width, each panel having two ends, wherein each end of one of the panels connects to one end of another of the panels such that the side panels interconnect to form a substantially rectangular base. The stand has a generally rectangular top support panel having four edges, wherein each edge is connected to an edge of each side panel. The stand has four generally rectangular retention lip members of a predetermined height and width connected to an outer surface of the top support panel and upwardly and outwardly extending from the edges of the top support panel, the retention lip members having two ends, wherein each end of one of the retention lip members connects to one end of another of the retention lip men%hers such that the retention lip members interconnect, wherein the top support member and retention lip members form a water retainer, at least on of the retention lip members further including a punch-out portion which is removable to provide an opening surface adapted to receive a drain pipe thereto.

The water heater- stand is further characterized such that each the retention lip member includes the punch-out portion. The top support panel is slightly dome shaped to aid drainage.

Another embodiment is directed to a height adjustable stand for supporting water heaters of various sizes, comprising a generally cylindrical base member of a predetermined height and width and a generally circular top support member having a peripheral edge, wherein the edge is connected to an edge of the base member. The stand includes a generally cylindrical retention lip member of a predetermined height and diameter connected to an outer surface of the top support member and upwardly and outwardly extending from the peripheral edge of the top support member, wherein the top support member and retention lip member form a water retainer, the retention lip member further including a punch-out portion which is removable to provide an opening surface adapted to receive a drain pipe thereto.

Preferably, the top support member is slightly dome shaped. The retention lip member is further characterized to include a plurality of punch-out portions substantially equidistantly spaced about the circumference of the retention lip member.

Other features and advantages of the invention will be apparent to those skilled in the art upon review of the following drawings, detailed description and claims appended hereto.

DETAILED DESCRIPTION OF THE PREFERRED EMBODIMENTS

Figure 1:
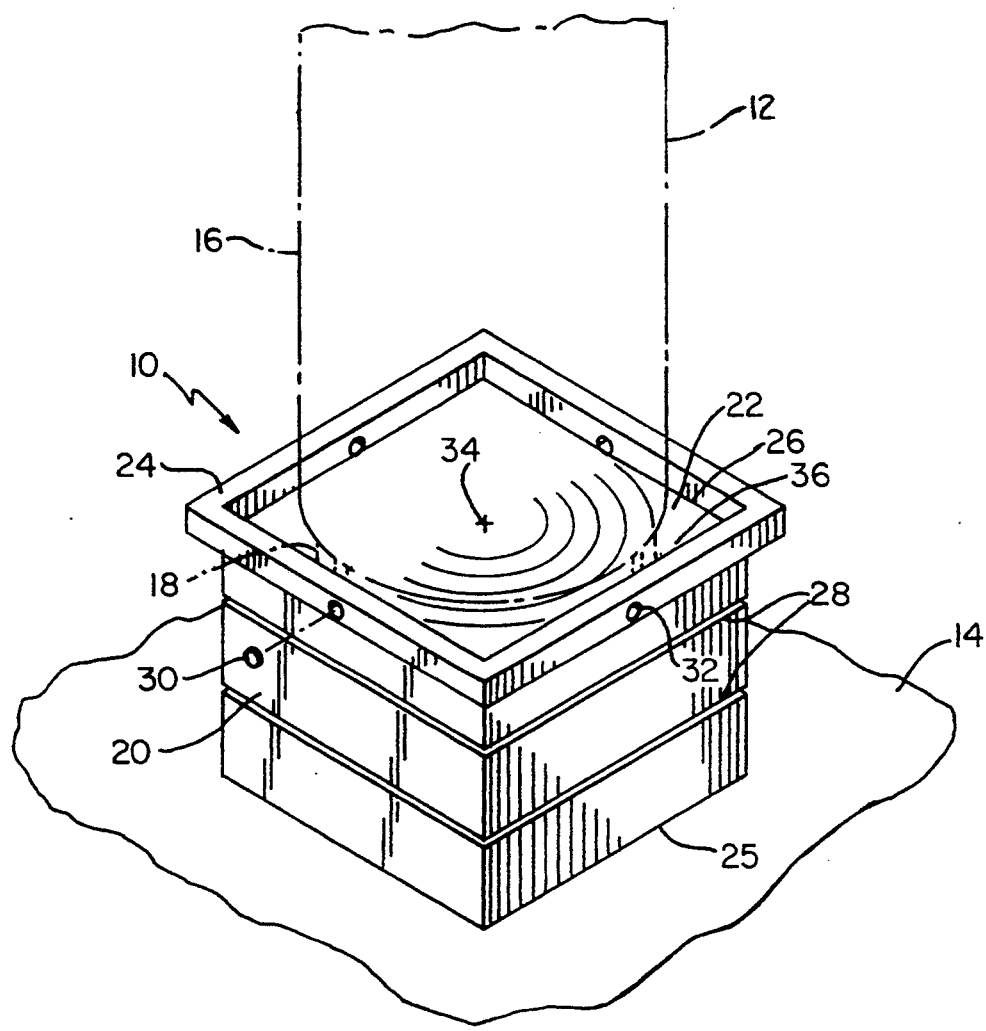
FIG. 1 is a perspective view of a stand in one embodiment of the present invention supporting a water heater.

Referring to FIG. 1, a stand 10 is shown as supporting a residential water heater 12 above the support floor 14. The water heater 12 is of a typical size ranging between about 18–20 inches in diameter. The water heater 12 has a generally cylindrical tank housing 16 and optionally a base or support legs 18 which are typically an inch or two inch height.

The stand 10 is of a width to accomodate and support the water heater 12 with or without its legs 18. The stand 10 is comprised of side panels 20, support surface 22, and retention lip members 24. The panels 20, support surface 22 and retention lip members 24 are preferably integrally formed and are made of a plastic material such as polyethylene, cellulosics, polystyrene, acrylic polymers, fluorocarbon resins, nylon, phenolics, polyamides, and silicones, or engineering plastics for sustaining heavy loads, such as polycarbonates, ABS resins, polyvinyl chloride, PPO/styrene and polybutylene terephthalate. Ingredients such as curatives, fillers, reinforcing agents, colorants and fire retardant agents known to the art may be included in the plastic material to achieve a desired set of properties. For example, to provide adequate support for the water heater, the side panels' 20 and support surface's 22 thickness will vary depending upon the type of plastic materials chosen. Preferably, it will be desirable to form the stand 10 of a plastic material which is light weight, fire retardant and capable of sustaining loads in excess of 600 lbs.

Figure 3:
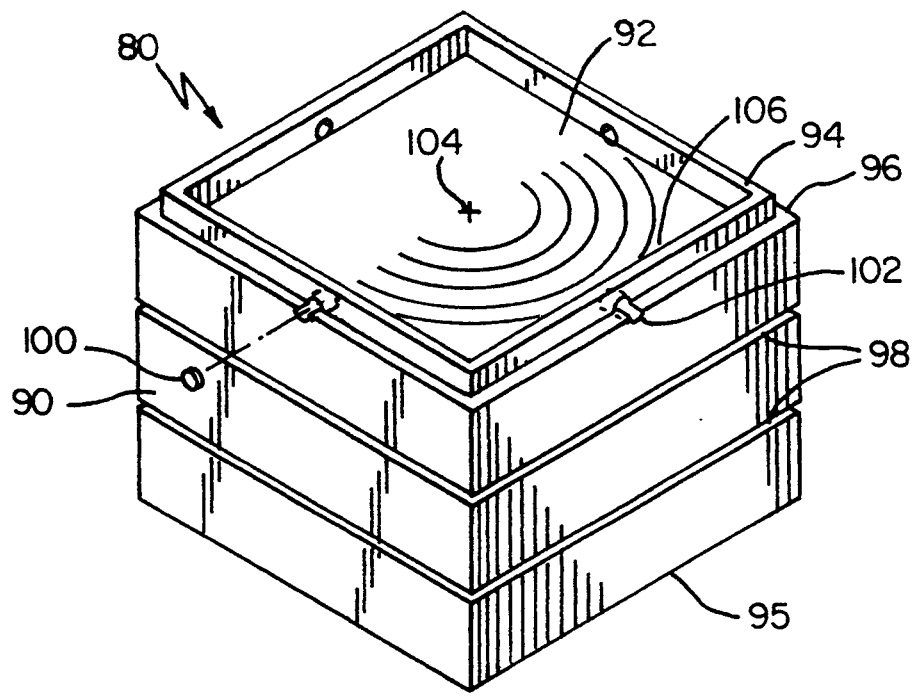
FIG. 3 is a perspective view of a stand in still another embodiment of the present invention.
Figure 4:
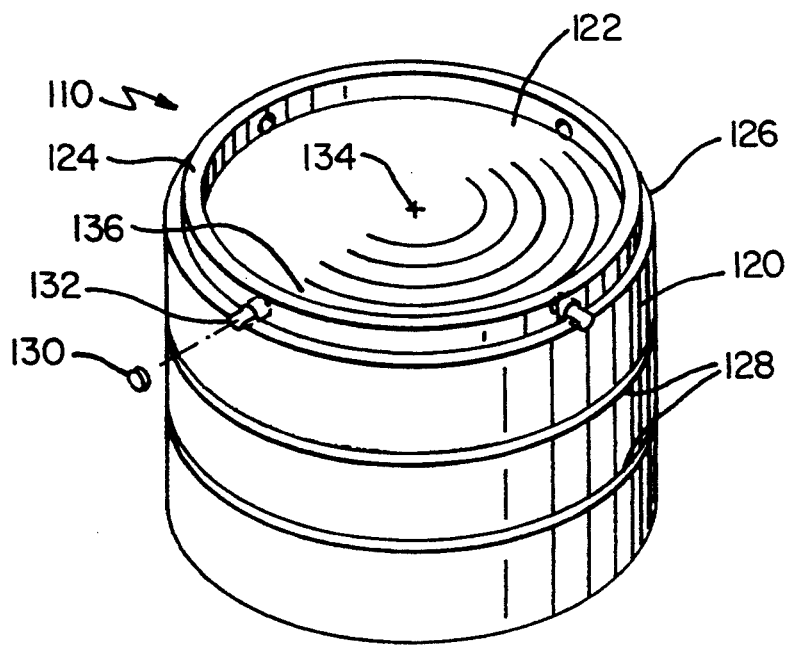
FIG. 4 is a perspective view of a stand in yet another embodiment of the present invention.

The retention lip members 24 are preferably upwardly and outwardly extending from the outer edges 26 of the support surface 22 such that an area is defined within the retention lip members 24 which is substantially equal that of the base 25 which includes the interconnecting side panels 20. This allows for the stand 10 to be stacked one on top of the other in a relatively stable fashion to incrementally increase the height of the stand 10. While the retention lip members 24 are shown as described above, it is contemplated that the retention lip members 24 could act as the tongue to fit within a groove formed within a bottom edge of the side panels 20 when stacked, or inwardly spaced as shown in FIGS. 3 and 4. The height of the retention lip members 24 is to be minimized so that the members 24 do not cause an interference when moving the water heater 12 for installation and removal thereof.

The side panels 20 are also formed with cut-away grooved surfaces 28 which are substantially equidistantly spaced from one another. The grooved surfaces 28 provide means for easy and uniform cutting of the stand 10 to reduce the height.

The retention lip members 24 have formed therein punch-out portions 30. While the punch-out portions 30 remain part of the retention lip member's 24, a water retention surface is maintained. One of the punch-out portions 30 is preferably removed to form an opening surface 32 to which a drain pipe can be readily attached and enable direction of leakage and connection to a flower drain. In this regard, the opening surface 32 can be threaded to receive a male threaded pipe. Alternatively, the stand 10 is formed of a plastic material which allows the opening surface 32 to be self threading. Additionally, the pipe may be solvent welded to the opening surface 32. It is also contemplated that punch-out portions may be formed in other locations such as the support surface or at the connection between the retention lip member and the support surface see FIGS. 3 and 4, for example.

The support surface 22 is slightly arcuate or dome shaped to aid drainage to the opening surface 32. With this said, the support surface 22 is of a minimal pitch to allow for quick and stable placement of the water heater 12 thereon. For example, a pitch of approximately one quarter inch from a center point 34 of the support surface 22 to the point 36 of the support surface 22 adjacent the opening surface 32.

FIG. 3 shows a stand 80 constructed in a similar manner having side panels 90, support surface 92, retention lip members 94, base 95, support surface edges 96, grooved surfaces 98, punch-out portions 100, opening surface 102, center point 104 of surface 92, and surface point 106 of surface 92. The difference between the stand 10 and stand 80 being that the retention lip 94 is inwardly spaced from the edges 96 a distance approximately equal that of the thickness of the side panel 90 so that the stand 80 can be stacked on a like stand.

Figure 2:
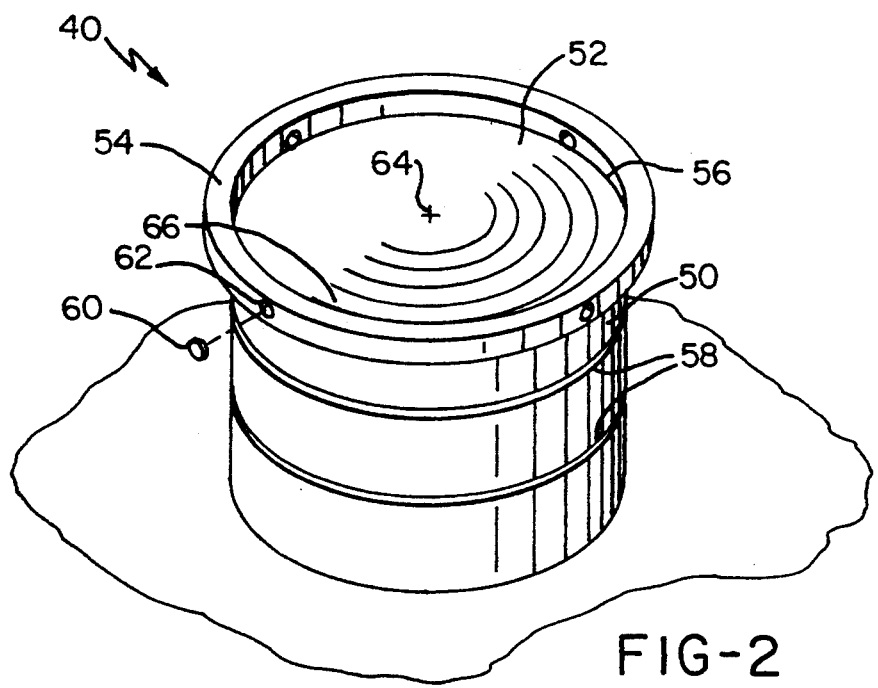
FIG. 2 is a perspective view of a stand in another embodiment of the present invention.

Referring to FIG. 2, stand 40 is shown. The stand 40 includes a generally cylindrical base panel 50, support surface 52, and generally cylindrical retention lip member 54. Likewise, the panel 50, support surface. 52 and retention lip member 54 are preferably integrally formed of a material described above.

The retention lip member 54 is upwardly and outwardly extending from the outer edge 56 of the surface 52 in a similar manner as described above. Likewise, this provides for stackability and incremental height increase. Similarly, the panel 50 is formed with cut-away grooved surface 58 which are substantially equidistantly spaced from one another for easy and uniform cutting of the stand 40 to reduce the height.

The retention lip member 54 has formed therein punch-out portions 60 which are circumferentially spaced approximately 90 degrees apart. While the punch-out portions 60 remain part of the retention lip member 54, a water retention surface is maintained. Again, one of the punch-out portions 60 is preferably removed to leave an opening surface 62 formed in the retention lip member 54 to which a drain pipe can be readily attached as described above allowing for easy connection to a drain. The support surface 52 is likewise slightly arcuate or dome shaped to aid drainage a center point 64 of the support surface 52 to a point 66 adjacent the opening surface 62 of the support surface 52, yet enable quick and stable placement of the water heater thereon.

FIG. 4 shows a stand 110 constructed in a similar manner having side panel 120, support surface 122, retention lip member 124, surface edge 126, grooved surfaces 128, punch-out portions 130, opening surface 132, center point 134 of surface 122, and surface point 136 of surface 122. Again, the difference between the stand 40 and stand 110 being that the retention lip 124 is inwardly spaced from the edge 126 a distance approximately equal that of the thickness of the side panel 120 so that the stand 110 can be stacked on a like stand.

The above described embodiment provides for a stand which can be quickly and readily employed to raise the water heater to a desired height. The embodiments also provide for a water heater stand which is not susceptible to deteriorating over time and is capable of sustaining water heaters of various sizes in a relatively safe manner. The stand requires little or no assembly and minimal working area in which to install. The symmetrical design aids in the ease of installation in that the stand can be set in place with minimal concern as to orientation, and the stand provides means for adapting a drain pipe to a desired side or circumferential location of the stand.

Various other embodiments and variations of the preferred embodiments will be apparent to those skilled in the art and may be made without departing from the spirit and scope of the invention as defined by the following claims.

What is claimed is:

1. A height adjustable water heater stand for raising water of various sizes above a support floor a distance which is above and beyond a region of air lying adjacent the floor which is susceptable to containing flammable fumes emanating from flammable liquids on the floor, comprising:
   a base of a predetermined height extending from the floor to a sufficient distance above the region of air;
   a support surface panel connected to said base in a manner to support the water heater above the region of air; and
   a retention lip member extending generally upwardly from said support surface to retain leakage from the water heater and having at least one punch-out portion formed therein which when removed provides an open surface in said retention lip member to which a drain pipe can be readily connected thereto, and wherein a surface of said base is formed with at least one grooved surface portion laterally spaced from an edge of said base to permit said base to be uniformly cut and down sized.

2. A height adjustable water heater stand for raising water heaters of various sizes above a support floor a distance which is above and beyond a region of air lying adjacent the floor which is susceptible to containing flammable fumes emanating from flammable liquids on the floor, comprising:
   a base of a predetermined height extending from the floor to a sufficient distance above the region of air;
   a support surface panel connected to said base in a manner to support the water heater above the region of air; and
   a retention lip member extending generally upwardly from said support surface to retain leakage from the water heater, and wherein said base is characterized to include four generally rectangular side panels of a predetermined height and width, each said side panel having two ends, wherein each end of one of said side panels connects to one end of another of said side panels such that said side panels interconnect so that said base is substantially rectangular, and wherein said support surface panel is characterized as generally rectangular having four edges, wherein each said edge is connected to an edge of each said side panel, and wherein said retention lip member is characterized as including four generally rectangular lip portions of a predetermined height and width connected to an outer surface of said support surface panel and outwardly extending from said edges of said support surface panel, said retention lip members having two ends, wherein each end of one of said retention lip members connects to one end of another of said retention lip members such that said retention lip members interconnect, and having at least one punch-out portion formed adjacent said connection of one of said lip portions and said support surface which when removed provides an opening surface to which a drain pipe can be readily connected thereto.

3. The water heater stand of claim 2, which is further characterized to be integrally formed.

4. The water heater stand of claim 2, wherein said support surface is dome shaped.

5. The water heater stand of claim 2, which is further characterized such that a surface of each said side panel is formed with at least one grooved surface portion laterally spaced from said edge of each said side panel such that each grooved surface portion correspondingly align with one another.

6. A height adjustable water heater stand for raising water heaters of various sizes above a support floor a distance which is above and beyond a region of air lying adjacent the floor which is susceptible to containing flammable fumes emanating from flammable liquids on the floor, comprising:
   a base of a predetermined height extending from the floor to a sufficient distance above the region of air;
   a support surface panel connected to said base in a manner to support the water heater above the region of air; and
   a retention lip member extending generally upwardly from said support surface to retain leakage from the water heater, and wherein said base is generally cylindrical of a predetermined height and width, wherein said support surface panel is generally circular having a peripheral edge, wherein said edge is connected to an edge of said base, and wherein said retention lip member is generally cylindrical of a predetermined height and diameter connected to an outer surface of said support surface panel and outwardly extending from said peripheral edge of said support surface panel, and which further includes at least one punch-out portion formed adjacent said connection of one of said retention lip member and said support surface which when removed provides an opening surface to which a drain pipe can be readily connected thereto.

7. The water heater stand of claim 6, which is further characterized to be integrally formed.

8. The water heater stand of claim 6, which is further characterized such that an outer surface of said base is formed with at least one grooved surface portion laterally spaced from said edge of said base a predetermined distance such that said base can be uniformly cut and downsized.

9. The water heater stand of claim 6, wherein said support surface is dome shaped.

10. A height adjustable water heater stand for raising water heaters of various sizes above a support floor a distance which is above and beyond a region of air lying adjacent the floor which is susceptible to containing flammable fumes emanating from flammable liquids on the floor, comprising:

four generally rectangular side panels of a predetermined width and height extending from the floor to a sufficient distance above the region of air, each said side panel having two ends, wherein each end of one of said side panels connects to one end of another of said side panels such that said side panels interconnect to form a substantially rectangular base;

a generally rectangular top support panel having four edges, wherein each said edge is connected to an edge of each said side panel in a manner to support the water heater thereon above the region of air; and four generally rectangular retention lip members of a predetermined height and width connected to an outer surface of said top support panel and outwardly extending from said edges of said top support panel, said retention lip members having two ends, wherein each end of one of said retention lip members connects to one end of another of said retention lip members such that said retention lip members interconnect, wherein said top support member and retention lip members form a water retainer, at least one of said retention lip members includes a punch-out portion which is movable to provide an opening surface adapted to receive a drain pipe thereto.

11. The water heater stand of claim 10, which is further characterized such that each said retention lip member includes said punch-out portion and of a height to allow relatively easy placement of the water heater on said top support member and removal therefrom.

12. The water heater stand of claim 10, wherein said top support panel is slightly dome shaped.

13. The water heater stand of claim 10, wherein a surface of each said side panel is formed with at least one grooved surface portion laterally spaced from said edge of each said side panel such that each grooved surface portion correspondingly align with one another to permit said base to be uniformly cut and down sized.

14. A height adjustable water heater stand for raising water heaters of various sizes above a support floor a distance which is above and beyond a region of air lying adjacent the floor which is susceptible to containing flammable fumes emanating from flammable liquids on the floor, comprising:

a generally cylindrical base member of a predetermined width and height extending from the floor to a sufficient distance above the region of air;

a generally circular top support men, her having a peripheral edge, wherein said edge is connected to an edge of said base member in a manner to support the water heater above the region of air; and a generally cylindrical retention lip member of a predetermined height and diameter connected to an outer surface of said top support member and outwardly extending from said peripheral edge of said top support member, wherein said top support member and retention lip member form a water retainer, said retention lip member further including a punch-out portion which is removable to provide an opening surface adapted to receive a drain pipe thereto.

15. The water heater stand of claim 14, wherein said top support member is slightly dome shaped.

16. The water heater stand of claim 14, wherein said retention lip member is further characterized to include a plurality of punch-out portions substantially equidistantly spaced about the circumference of the retention lip member and wherein said retention lip member is of a height to allow relatively easy placement of the water heater on said top support member and removal therefrom.

17. The water heater stand of claim 14, wherein said retention lip member is further characterized to include four punch-out portions substantially equidistantly spaced about the circumference of the retention lip member.

18. The water heater of claim 14, wherein a surface of said base member is formed with at least one grooved surface portion extending about the circumference of said base and is laterally spaced from said edge of said base a predetermined distance such that said base can be uniformly cut and down sized.

19. A height adjustable water heater stand for raising water heaters of various sizes above a support floor a distance which is above and beyond a region of air lying adjacent the floor which is susceptible to containing flammable fumes emanating from flammable liquids on the floor, comprising:

a base of a predetermined height extending from the floor to a sufficient distance above the region of air;

a support surface panel connected to said base in a manner to support the water heater above the region of air; and a retention lip member extending generally upwardly from said support surface to retain leakage from the water heater, and wherein said base is characterized to include four generally rectangular side panels of a predetermined height and width, each said side panel having two ends, wherein each end of one of said side panels connects to one end of another of said side panels such that said side panels interconnect so that said base is substantially rectangular, and wherein said support surface panel is characterized as generally rectangular having four edges, wherein each said edge is connected to an edge of each said side panel, and wherein said retention lip member is characterized as including four generally rectangular lip portions of a predetermined height and width connected to an outer surface of said support surface panel and inwardly spaced from said edges of said support surface panel and outwardly extending from said support surface panel, said retention lip members having two ends, wherein each end of one of said retention lip members connects to one end of another of said retention lip members such that said retention lip members interconnect, and having at least one punch-out portion formed adjacent said connection of one of said lip portions and said support surface which when removed provides an opening surface to which a drain pipe can be readily connected thereto.

20. The water heater stand of claim 19, wherein said support surface is dome shaped.

21. The water heater stand of claim 19, which is further characterized to he integrally formed.

22. The water heater stand of claim 19, which is further characterized such that a surface of each said side panel is formed with at least one grooved surface portion laterally spaced from said edge of each said side panel such that each grooved surface portion correspondingly align with one another.

23. A height adjustable water heater stand for raising water heaters of various sizes above a support floor a distance which is above and beyond a region of air lying adjacent the floor which is susceptible to containing flammable fumes emanating from flammable liquids on the floor, comprising:
- a base of a predetermined height extending from the floor to a sufficient distance above the region of air;
- a support surface panel connected to said base in a manner to support the water heater above the region of air; and
- a retention lip member extending generally upwardly from said support surface to retain leakage from the water heater, and wherein said base is generally cylindrical of a predetermined height and width, wherein said support surface panel is generally circular having a peripheral edge, wherein said edge is connected to an edge of said base, and wherein said retention lip member is generally cylindrical of a predetermined height and diameter connected to and outwardly extending from an outer surface of said support surface panel and inwardly spaced from said peripheral edge of said support surface panel, and which further includes at least one punch-out portion formed adjacent said connection of one of said retention lip member and said support surface which when removed provides an opening surface to which a drain pipe can be readily connected thereto.

24. The water heater stand of claim 23, wherein said support surface is dome shaped.

25. The water heater stand of claim 23, which is further characterized such that an outer surface of said base is formed with at least one grooved surface portion laterally spaced from said edge of said base a predetermined distance such that said base can be uniformly cut and downsized.

26. The water heater stand of claim 23, which is further characterized to be integrally formed.

* * * * *

UNITED STATES PATENT AND TRADEMARK OFFICE
CERTIFICATE OF CORRECTION

PATENT NO. : 5,368,263
DATED : November 29, 1994
INVENTOR(S) : Guy W. Harrison

It is certified that error appears in the above-indentified patent and that said Letters Patent is hereby corrected as shown below:

In column 2, line 45 delete "men%hers" and insert --members--.

In column 2, line 51 delete the hyphen after "heater".

In column 4, line 10 delete "member's" and insert --members--.

In claim 1, column 5, line 34, after "water" insert--heaters--.

In claim 1, column 5, line 48, delete "open and insert --opening --.

In claim 10, column 7, line 36, delete "movable" and insert --removable--.

In claim 14, column 7, line 61, delete "men, her" and insert --member--.

In claim 21, column 9, line 4, delete "he" and insert --be--.

Signed and Sealed this

Eighteenth Day of April, 1995

Attest:

BRUCE LEHMAN

Attesting Officer

*Commissioner of Patents and Trademarks*